Jan. 25, 1966 J. T. LINDQUIST ETAL 3,230,621
ORTHODONTIC APPLIANCE
Filed Oct. 30, 1962 2 Sheets-Sheet 1

INVENTORS
John T. Lindquist
BY Morris M. Stoner

ATTORNEY

Jan. 25, 1966 J. T. LINDQUIST ETAL 3,230,621
ORTHODONTIC APPLIANCE
Filed Oct. 30, 1962 2 Sheets-Sheet 2

INVENTORS
John T. Lindquist
BY Morris M. Stoner

Robert H. Simmons
ATTORNEY 3,230,621
Patented Jan. 25, 1966

3,230,621
ORTHODONTIC APPLIANCE
John T. Lindquist and Morris M. Stoner, Indianapolis, Ind., assignors to Orthodontic Supply Corporation and Research, Incorporated, Indianapolis, Ind., a corporation of Indiana
Filed Oct. 30, 1962, Ser. No. 234,057
13 Claims. (Cl. 32—14)

The present invention relates to orthodontic appliances and more particularly to an improved orthodontic traction appliance commonly known as a face-bow appliance.

Orthodontic face-bow appliances are commonly used as traction devices in the preliminary treatment of dental malocclusion. Such a device generally comprises an intra-oral segment adapted to engage bands placed to surround predetermined teeth, generally in the upper dental arch. An extra-oral segment attached to the intra-oral arch. An extra-oral segment attached to the intra-oral segment and having loops at the ends thereof provides means for attaching a tensioning device, generally an elastic band which fits the posterior contour of the skull. With the face-bow appliance placed intra-orally to engage the bands surrounding predetermined teeth and the elastic band attached and suitably adjusted, pressure may be applied to the teeth. Over a period of time the pressure will cause a displacement of the teeth in the alveolar process of the dental arch.

With such known devices and proper guidance, a distal displacement of teeth in the alveolar process of the dental arch may be accomplished. It is sometimes desirable, however, to accomplish both a distal and simultaneously, a lateral movement of teeth in the alveolar process of the dental arch.

Accordingly, it is an important object of the present invention to provide an improved orthodontic appliance of the face-bow type in which more than one direction of tooth movement may be obtained simultaneously.

It is a further object of this invention to provide an orthodontic appliance of the face-bow type in which simultaneous movement of predetermined teeth both in a direction laterally to and distally along the dental arch, may be obtained.

It is still a further object of this invention to provide an orthodontic appliance of the face-bow type with means to induce varying combinations of forces to reposition similar teeth in the alveolar process in the dental arch, laterally-inwardly, laterally-outwardly or laterally in the same direction as well as distally.

Figure 1:
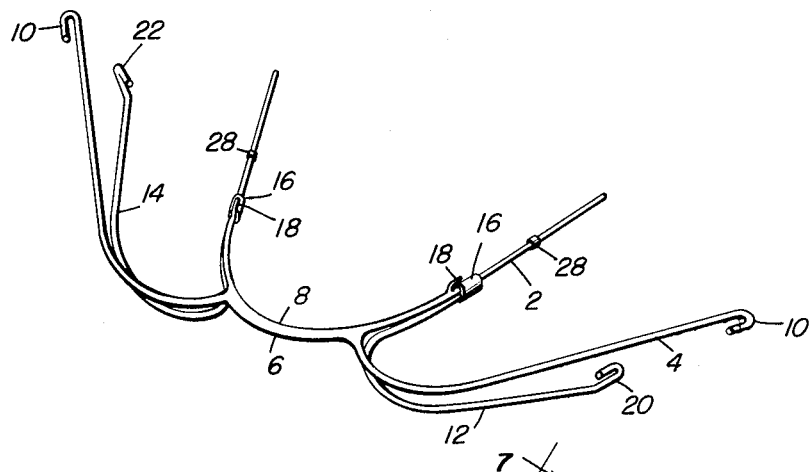
Figure 2:
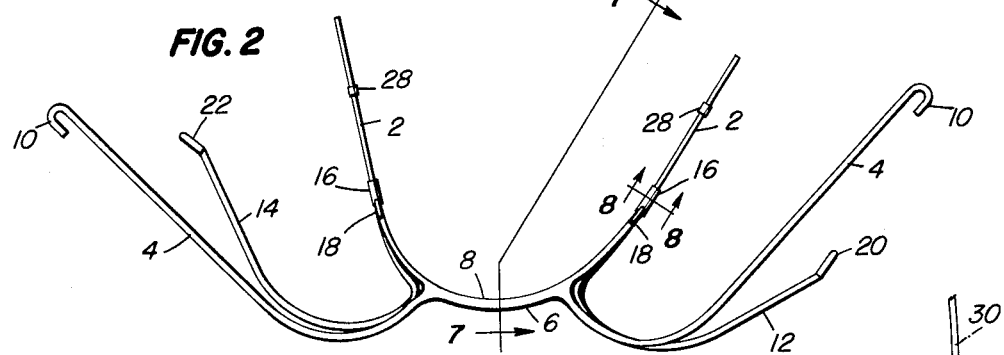
Figure 3:
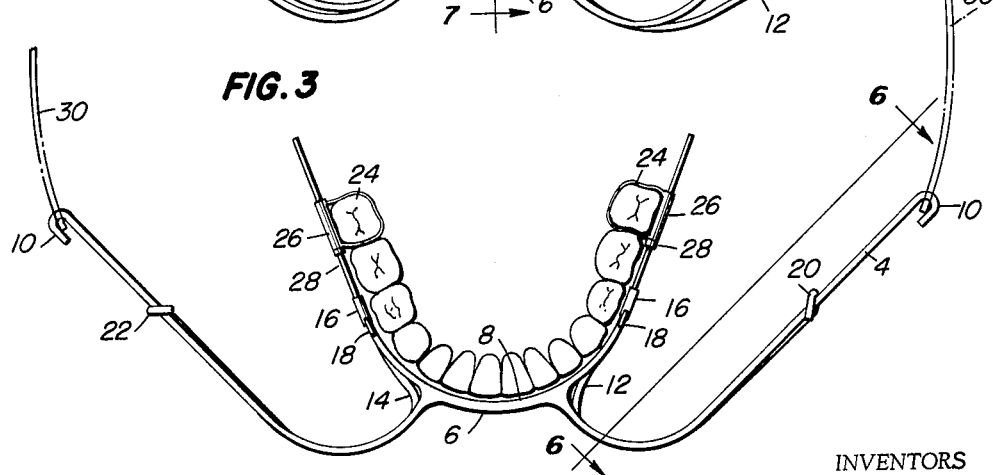
Figure 4:
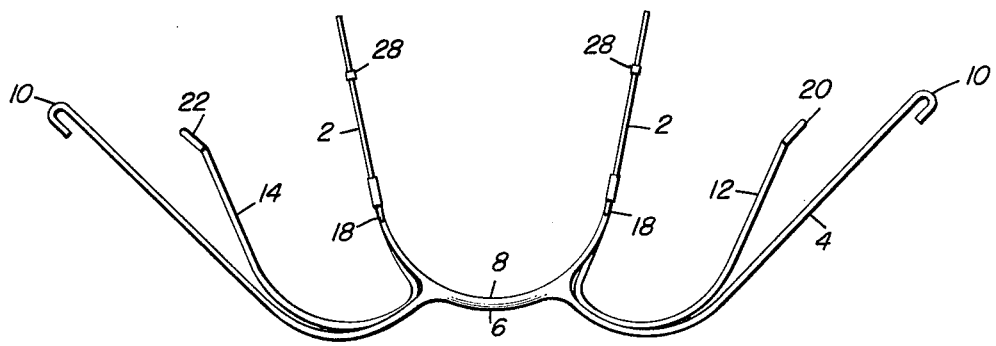
Figure 5:
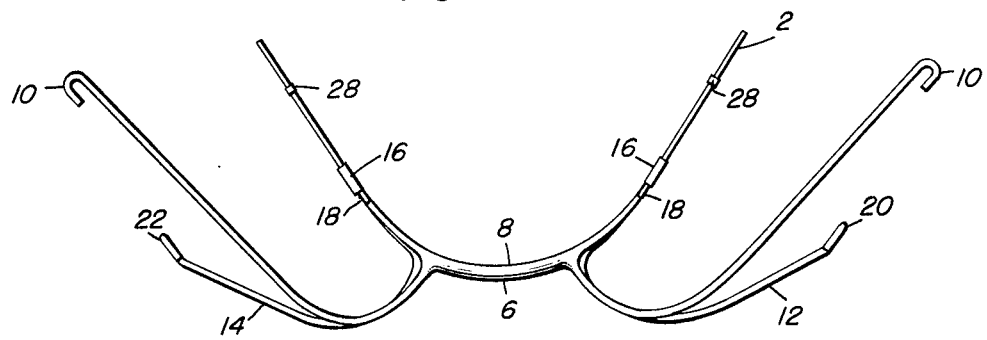
Figure 6:
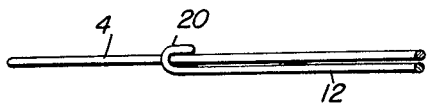
Figure 8:
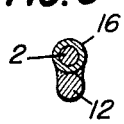
Figure 7:
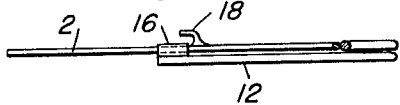

For a better understanding of the objects and the various advantageous features of the present invention, reference may be had to the following description along with the accompanying drawings in which FIGURE 1 is a perspective view of one modification of the orthodontic appliance of the present invention; FIGURE 2 is a plan view of the appliance of FIGURE 1; and FIGURE 3 is a plan view of the appliance similar to the appliance of FIGURE 2 but in its position of function adjacent the teeth of a dental arch; FIGURE 4 is a plan view of another modification of the appliance of the invention; FIGURE 5 is a plan view of still another modification of the appliance of the invention; FIGURE 6 is a view taken along the line 6—6 of FIGURE 3; FIGURE 7 is a view taken along the line 7—7 of FIGURE 2 and FIGURE 8 is an enlarged cross-sectional view taken along the line 8—8 of FIGURE 2.

Referring now to the drawings and particularly to FIGURES 1, 2 and 3, there is illustrated a face-bow orthodontic appliance embodying the present invention and comprising a generally U-shaped segment 2 of stainless steel wire of suitable diameter preferably .045 inch which is adapted to be inserted intra-orally into juxtaposition with the teeth of the dental arch. An extra-oral stainless steel wire segment 4 formed into a generally W-shape and having a diameter of .060 inch, has a substantial length 6 of its mid-section secured to a corresponding mid-section portion 8 of the intra-oral segment 2 by suitable means such as soldering or welding. The opposite ends of the extra-oral segment 4 are provided with return-bent portions of the wire to form attaching hooks 10.

To obtain lateral pressures in the end portions of the intra-oral segment 2, wire loops 12 and 14 are provided. These loops are formed of stainless steel wire of substantially the same diameter as the extra-oral segment and have a tubular member 16 secured to one end thereof by soldering or welding, as shown, particularly in FIGURES 7 and 8. The tubular members have an inner diameter which adapts them to slidably receive the end portions of the intra-oral segment 2. The opposite ends of the loops 12 and 14 are formed with return-bent portions 20 and 22 which are adapted to engage and clasp the extra-oral segment 4 as shown in FIGURE 3. Stop-members 18, see FIGURE 7, are fixedly attached to the intra-oral segment 2 and provide means for limiting the sliding movement of the loops 12 and 14 on the intra-oral segment 2. In the appliance illustrated in FIGURES 1, 2 and 3, it will be observed that the return-bent loop 20 is bent laterally and angularly-inwardly so that the free arm of loop 12 carrying the clasping loop 20, when stressed inwardly, may engage and clasp the corresponding arm of the extra-oral segment 4, refer particularly to FIGURES 3 and 6, to cause a laterally-inward pressure in the end portion of the intra-oral segment 2 to which the loop 12 is attached.

Similarly, loop 22 of the loop segment 14 is bent laterally and angularly-outwardly so that its free arm when stressed outwardly may engage and clasp the opposite arm of the extra-oral segment 6 to cause a lateral and outward pressure to be introduced in the corresponding end portion of the intra-oral segment 2.

Referring now to FIGURE 4, illustrating a modification of the invention, it will be observed that the loop segments 12 and 14 are provided with loops 20 and 22 both of which are bent angularly and laterally-outwardly. With this modification of the appliance of the invention, it will be observed, that by springing the free ends of the loops 12 and 14 outwardly to clasp the ends of the extra-oral segment, lateral and outward pressure is induced in both ends of the intra-oral segment 2.

Referring now to FIGURE 5 illustrating still another modification of the invention, it will be observed, that the loop segments 12 and 14 are provided with loops 20 and 22 both of which are bent angularly and laterally-inwardly. With this modification of the appliance of the invention, it will be observed, that by springing the free ends of the loops 12 and 14 inwardly to clasp the ends of the extra-oral segment, lateral and inward pressure is induced in both end portions of the intra-oral segment 2.

Referring again to FIGURE 3, the orthodontic appliance is illustrated with the intra-oral segment in juxtaposition with the teeth of the dental arch. As shown, bands 24 are adapted to surround predetermined molar teeth and have attached thereto tubular members 26 which are adapted to slidably receive the free ends of the intra-oral segment 2. Secured to the free ends of the intra-oral segment are stop-members 28 which when the appliance is placed intra-orally engage the tubular members 26. An elastic band 30, fragmentary portions being shown in FIGURE 3, is provided, with end portions adapted to be attached to loops 10 of the extra oral segment. While not completely shown, the elastic band 30 is made adjustable and when in use with the appliance in position in the oral cavity, is contoured to the posterior aspect of the skull and serves to induce a tension in the appliance which is transmitted through the appliance and stops 28 to the banded teeth. Accordingly, a pressure is introduced and transferred to these teeth which with time will move the teeth in the direction of the pressure. Simultaneously, with the free ends of loops 12 and 14 clasped, as shown, to the end portions of the extra-oral segment 4, a lateral pressure in the same direction is applied to the banded teeth.

With the device of our invention it will be obvious that simultaneous pressures may be applied to predetermined teeth in the dental arch to displace them into positions of normal occlusion with the teeth of the opposing dental arch.

While the embodiment of the present invention herein disclosed constitutes a preferred form, it is to be understood that other forms might be adopted all coming within the scope of the claims which follow.

What we claim and desire to secure by Letters Patent of the United States is:

1. An orthodontic face-bow appliance comprising intra and extra-oral members with means on the extra-oral member for securing the appliance to patient's head, said appliance having a supplemental loop with an end-portion extending in substantial parallelism with said intra-oral member and having a cylinder attached to the end thereof and a return bent portion at the opposite end thereof said cylinder being slidably secured to said intra-oral member and said return bent portion being adapted to clasp said extra-oral member.

2. An orthodontic face-bow appliance comprising intra and extra-oral members with means on the extra-oral member for securing the appliance to a patient's head, said appliance having a supplemental loop with an end-portion extending in substantial parallelism with said intra-oral member and having a cylinder attached to the end thereof and a return bent portion at the opposite end thereof, said cylinder being slidably secured to said intra-oral member and, said return bent portion being adapted to clasp said extra-oral member and a stop attached to said intra-oral member and adapted to limit movement of said cylinder thereon.

3. An orthodontic face-bow appliance comprising intra and extra-oral wire members with means on the extra-oral member for securing the appliance to a patient's head, said appliance having a supplemental loop with an end-portion extending in substantial parallelism with said intra-oral member and having a cylinder attached to the end thereof and a return bent portion at the opposite end thereof, said cylinder being slidably secured to said intra-oral member and said return-bent portion being adapted to clasp said extra-oral member and a stop attached to said intra-oral member and adapted to limit movement of said cylinder thereon.

4. An orthodontic face-bow appliance comprising a U-shaped intra-oral wire member secured at its mid-portion to a W-shaped extra-oral wire member said extra-oral member having return bent portions at opposite ends thereof, a wire loop with one end-portion extending in substantial parallelism with said intra-oral member and having a cylinder attached to the end thereof and a return-bent portion at the opposite end thereof, said cylinder being slidably secured to said intra-oral member and said return-bent portion at the opposite end thereof being adapted to clasp said extra-oral member and a stop secured to said intra-oral member to limit movement of said cylinder thereon.

5. An orthodontic face-bow appliance comprising a U-shaped intra-oral wire member secured at its mid-portion to a W-shaped extra-oral wire member, said extra-oral member having return bent portions at opposite ends thereof, wire loop members with one end-portion extending in substantial parallelism with said intra-oral member and having cylinders attached to said end portion thereof and a return-bent portion at the opposite ends thereof, said cylinders being slidably secured to the opposite ends of said intra-oral member and said return-bent portion at the opposite ends thereof being adapted to clasp said extra-oral member at its end portions, stops secured to each of the end portions of said intra-oral member to limit movement of said cylinders thereon.

6. An orthodontic face-bow appliance having a U-shaped intra-oral wire member adapted to be attached to predetermined teeth in the dental arch, a W-shaped extra-oral wire member, means securing said members at their mid-portion so that the ends of said extra-oral member extends extra-orally, said extra-oral member having means for securing the appliance to a patient's head, loop members with end-portions extending in substantial parallelism with said intra-oral member and having tubular members affixed to the end portions thereof and slidably secured to the end portions of said intra-oral member, said loop members having at their opposite ends clasps adapted to engage the extra-orally extending ends of said extra-oral member, and stop members affixed to the end portions of said intra-oral member, to limit movement of said tubular members thereon.

7. An orthodontic face-bow appliance having a U-shaped intra-oral wire member adapted to be attached to predetermined teeth in the dental arch, a W-shaped extra-oral wire member, means securing said members at their mid-portions to permit the end portions of said intra-oral member to extend intra-orally adjacent to the teeth of the dental arch and the end portions of said extra-oral member to extend extra-orally, said extra-oral member having means for securing the appliance to a patient's head, wire loop members with end-portions extending in substantial parallelism with said intra-oral members and having tubular members affixed to said end portions and slidably secured on the end portions of said intra-oral member, return-bent portions formed in the opposite ends of said loop members and adapted to clasp the end portions of said extra-oral member said return-bent portions being formed to engage the contour of said extra-oral wire member to induce a lateral and inward stress in the ends of said intra-oral member and stop members fixed to said intra-oral members to limit movement of said tubular members thereon.

8. An orthodontic face-bow appliance having a U-shaped intra-oral wire member adapted to be attached to predetermined teeth in the dental arch, a W-shaped extra-oral wire member, means securing said members at their mid-portions to permit the end portions of said intra-oral member to extend intra-orally adjacent to the teeth of the dental arch and the end portions of said extra-oral member to extend extra-orally, said extra-oral member having means for securing the appliance to a patient's head, wire loop members with end-portions extending in substantial parallelism with said intra-oral member and having tubular members affixed to said end portions and slidably secured on the end portions of said intra-oral member, return-bent portions formed in the opposite ends of said loop member and adapted to clasp the end portions of said extra-oral member, said return-bent portion being formed to engage the contour of said extra-oral wire member opposite the facial contour to induce a lateral and outward stress in the ends of said intra-oral member and stop members fixed to said intra-oral member to limit movement of said tubular members thereon.

9. An orthodontic face-bow appliance having a U-shaped intra-oral wire member adapted to be attached to predetermined teeth in the dental arch, a W-shaped extra-oral wire member, means securing said members at their mid-portion to permit the end portions of said intra-oral member to extend intra-orally adjacent the teeth of the dental arch and the end portions of said extra-oral member to extend extra-orally, said extra-oral member having means for securing the appliance to the patient's head, wire loop members with end-portions extending in substantial parallelism with said intra-oral member and having tubular members affixed to said end portions and slidably secured on the end portions of said intra-oral member, return-bent portions formed in the opposite end of said loop members and adapted to clasp the end portions of said extra-oral member, one of said return-bent portions being formed to engage the contour of said extra-oral wire member to introduce a lateral and outward stress in the engaged end of said extra-oral member, the other of said return-bent portions being formed to engage the contour of said extra-oral wire member to introduce a lateral and inward stress in the engaged end of said extra-oral member to provide lateral stress in the same direction in said appliance and stop members fixed to said intra-oral member to limit movement of said tubular members thereon.

10. An orthodontic face-bow appliance comprising intra and extra-oral members connected at substantially their mid-portions, said extra-oral member having means for securing the appliance to a patient's head and a supplemental loop with one-end portion extending in substantial parallelism with and secured to said intra-oral member and having at its opposite end means engaging said extra-oral member to transmit stress between said intra and extra-oral members.

11. An orthodontic face-bow appliance comprising intra and extra-oral members connected at substantially their mid-portions, said extra-oral member having means for securing the appliance to a patient's head and a supplemental loop having an end-portion extending in substantial parallelism with said intra-oral member and slidably secured thereto, means at the opposite end of said loop detachably engaging said extra-oral member to transmit stress between said members.

12. An orthodontic face-bow appliance comprising intra and extra-oral members connected at substantially their mid-portions, said extra-oral member having means for securing the appliance to a patient's head and supplemental loops having one end-portion extending in substantial parallelism with said intra-oral member and secured thereto, means at the opposite end of said loops engaging said extra-oral member to transmit stress between said members.

13. An orthodontic face-bow appliance comprising an intra-oral member having a stop member thereon and an extra-oral member with means for securing the appliance to a patient's head said intra and extra-oral members being connected at substantially their mid-portions and a supplemental loop having one end-portion extending in substantial parallelism with said intra-oral member and slidably secured thereto with movement limited by said stop member, means at the opposite end of said loop for engaging said extra-oral member to transmit stress between said members.

References Cited by the Examiner
UNITED STATES PATENTS

| | | | |
|---|---|---|---|
| 2,334,894 | 11/1943 | Atkinson | 32—14 |
| 3,036,380 | 5/1962 | Martinek et al. | 32—140 |

RICHARD A. GAUDET, *Primary Examiner.*

ROBERT E. MORGAN, *Examiner.*